May 10, 1960

C. H. ANSINGH 2,936,010

SCREW DRIVER BIT

Filed Dec. 17, 1956

INVENTOR
CARL H. ANSINGH

Douglas S. Johnson
ATTY.

United States Patent Office 2,936,010
Patented May 10, 1960

2,936,010

SCREW DRIVER BIT

Carl H. Ansingh, Milton, Ontario, Canada, assignor to P. L. Robertson Mfg. Co. Limited, Milton, Ontario, Canada Application December 17, 1956, Serial No. 628,714

6 Claims. (Cl. 145—50)

This invention relates to improvements in bits for screw drivers, and more particularly to bits for driving square or Robertson type socket screws.

The principal object of the invention is to provide an improved bit which will exhibit much greater resistance to all of the basic sources of wear, namely, abrasion, torque, and impact, than bits presently manufactured.

Again it is an important object to provide a bit as aforesaid which can be manufactured more economically than previous bits both from the standpoint of cost of material and cost of production.

In conventional manufacture of screw driver bits to fit the sockets of square socket type screws, a piece of drawn stock is milled to provide on one end of the stock the requisite configuration to fit the screw socket. Until the present, this bit end has been milled to form a slightly tapering main body portion of square cross-section terminating in a pyramidal point. Following the milling operation the bits are hardened by heat treating in the conventional manner.

The choice of stock which can be used for manufacturing present bits is restricted to relatively coarse grained metal, since the requirement for milling or machining limits the toughness of the metal which is dependent on grain size. This grain size is dependent, in turn, on the degree of cold working of the metal such as occurs in the drawing of the stock.

Not only does the present machining operation inherently limit the toughness of the original stock selected for the bits, but additionally, it removes the outer skin of the metal which in the drawing operation has received maximum cold working and is therefore the finest grained part of the metal. Thus, the metal exposed as a result of the machining is relatively weaker than the original stock and subject to a high incidence of abrasive wear. It will be understood that in selecting stock for bit manufacture, metal free of total or partial decarburization will be selected.

In the milling of the bit to form the square cross-section and pyramidal point cuts are made in right angular directions, the cutting in the subsequent directions providing a slight turn-over of metal or burr at the edges of the right angular faces. When the bits are subsequently heat treated in the hardening operation, the sharp edges at the intersecting faces, particularly where the burr has occurred, become overheated and as a result are extremely brittle. As a result, in use, these brittle edges readily fracture under impact providing relatively short bit life.

Prior to fracture, these sharp hardened bit edges form cutting elements capable of cutting into the softer metal of the screw, and as a result, reaming of the screw socket frequently occurs with the result that the bit is free to turn in the socket before the screw is driven fully home.

The present invention overcomes the above problems experienced with present bits, and further enables a higher torque to be developed from a bit of a given size produced from stock having smaller initial cross-section than its present counterpart.

According to the present invention, the bit is formed by cold forging one end of the stock to provide a main tapered socket engaging portion of square cross-section terminating in a blunt conical tip. In the cold forging operation, a portion of the metal of the stock is caused to flow outwardly to form an enlarged torque transfer formation linking the main socket engaging bit end and the bit shank which is adapted to be received in a tubular sleeve forming the screw driver shank.

In the cold forging operation the metal of the stock, particularly the surface layers, is cold worked to produce an extremely tough fine grained skin and, due to the fact that the metal is caused to flow in the forming of the bit shape, sharp edges which are subject to overheating in the subsequent hardening heat treatment, are eliminated.

It will be understood that in use the shank of the bit will be securely anchored in the collar formed by a tubular tool shank, and the socket engaging portion of the bit will be embedded in the screw socket and the torque stresses will therefore be developed in the intermediate unsupported torque transfer portion or section and it is a further feature of the invention to form this torque transfer section whereby it presents a cross-sectional area which progressively increases from both the shank and bit end along the bit axis to substantially its median plane. With this arrangement, there is maximum cross-sectional area to resist shear stresses midway between the supported and anchored shank and socket engaging bit end and also maximum working will have occurred at this point to provide a substantial layer of tough metal skin capable of transferring high torque stresses between the supported and anchored bit portions.

Another feature of the invention resides in forming the intermediate or median portion of the torque transfer section to provide a rosette-like configuration which affords a relatively stress free transition area between the opposing rectilinear or square cross-section bit portions either side thereof.

These and other objects and features will become apparent from the following description taken with reference to the accompanying drawings, in which.

Figure 1:
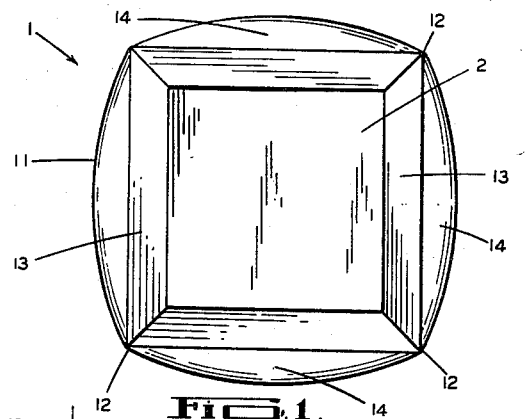
Figure 1 is a plan view of a bit for a screw driver embodying the invention.
Figure 4:
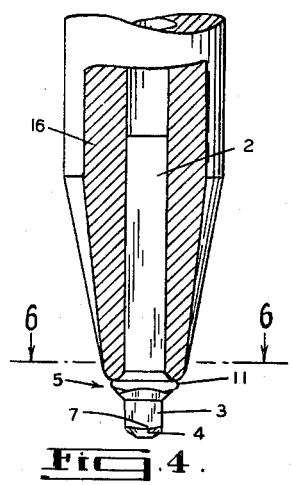
Figure 4 is a part elevational, part vertical sectional view, taken on the line 4—4 of Figure 6, of a tool shank in which the bit has been embedded.

Referring to the drawings, the bit, generally designated as 1, is formed from a length of stock of square cross-section, and has a shank portion 2, a tapered driving tip portion 3 terminating in a blunt conical end or point 4, and between the shank 2 and driving tip portion 3 an intermediate torque transfer portion 5. The shank portion 2 of the bit has the same cross-section as the stock from which the bit is formed, and this cross-section preferably is the same as the cross-section of the driving tip portion 3 at its smallest dimension.

Both the driving tip portion 3 and the torque transfer portion 5 are formed by cold forging, and it will therefore be understood that the cross-section of the shank portion 2 may be reduced below the cross-section of the lower end of the driving tip portion 3. In the cold forging operation, the stock is forced into a die, not shown, having the outline of the driving tip and torque transfer portions 3 and 5 while the metal of the stock is cold. Under impact, the metal of the stock is caused to flow to conform to the die configuration resulting in a cold forging of the metal of the stock as it conforms to the die to produce the configuration in the driving tip and torque transfer portions illustrated.

It will be understood to those skilled in the art that under the cold forging operation the displaced or cold forged metal as it flows will be subjected to grain structure changes producing a finer grain which imparts toughness to the metal. As the surface metal of the stock is subjected to the greatest degree of displacement and flow, cold working is a maximum at the surface producing an extremely fine grained tough skin on the driving tip and torque transfer portions 3 and 5, respectively.

It will be also understood that since no machining operation is involved in the forming of the bit, the initial stock before cold working in the forming of the bit portions 3 and 5 may be of much finer grained structure with corresponding toughness than stock which can be used where the bits are formed by machining.

By forming the end of the driving tip portion 3 of the bit as a conical point, the cold forming of the bit is facilitated as the metal is spread uniformly from the end 4 into the driving tip portion 3, and the juncture of the end 4 with the driving tip portion 3 is defined by the curved formations 7 which are portions of an ellipse. Not only does the conical end 4 permit the uniform distribution of the metal, but all sharp cutting edges at the tip of the bit are eliminated, thus eliminating a source of reaming, which occurs with present bits having pyramidal points at the end of the driving tip portions.

To ensure that the driving tip portion 3 of the bit can be accurately produced in a tapered form to fit the slight taper of the socket of a screw 8 with which the bit is to be used, the walls 9 of the driving tip portion are inclined at an angle of substantially 3° to the bit axis. If the inclination of the walls 9 to the axis is decreased below substantially 3°, then in the forming of the driving tip portion 3, the metal will offer such resistance to entry into the cavity of the forming die, that it would prevent a uniform reproduction of the shape of the die cavity. On the other hand, if the inclination were increased above substantially 3°, then there is a tendency of the metal to fold on entering the die cavity due to lack of proper support from the die giving rise to discontinuities in the metal known in the art as "cold shut." Further, if the inclination of the walls 9 is greater than substantially 3°, then there is a camming out action which results when the bit is used in the driving of a screw.

Figure 2:
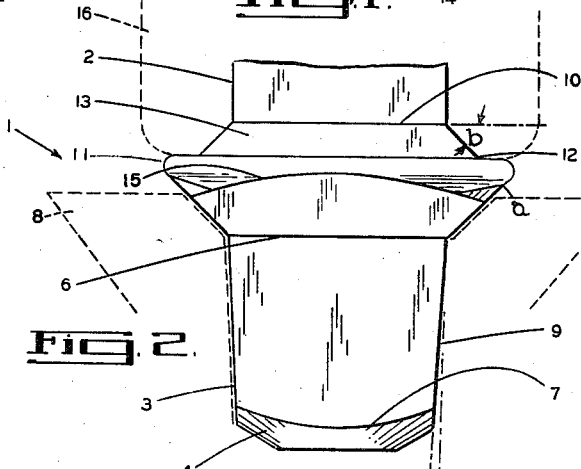
Figure 2 is a side-elevational view of the bit of Figure 1, partly broken away, and illustrating in dotted line the relationship with a tool shank and a screw which the bit is adapted to drive.
Figure 5:
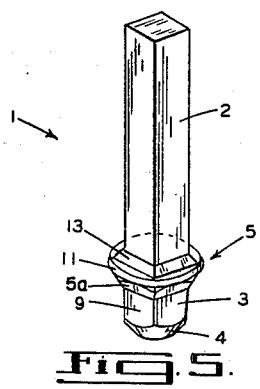
Figure 5 is a perspective view of the bit.
Figure 3:
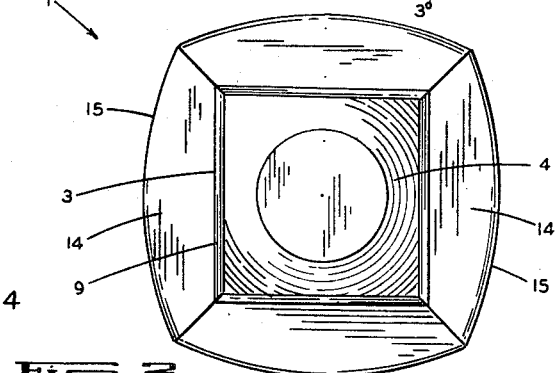
Figure 3 is an underside plan view of the bit of Figures 1 and 2.

Above the juncture lines 6 of the driving tip portion 3 of the bit, the metal of the stock is forced outwardly, preferably at an angle of 45°, forming the indicated angle $a$ in Figure 2. Thus the portion 5a of the torque transfer portion 5 immediately above the driving tip portion 3, as best seen in Figure 5, and also in Figure 2, is in the form of a frustum of a pyramid of square cross section diverging upwardly and outwardly towards the shank portion at an angle much greater than the angle of taper of the driving tip portion 3. The cross-section of the torque transfer portion 5 increases upwardly from the juncture lines 6 with the driving tip portion 3, and also downwardly from the juncture lines 10 with the shank portion 2 to a maximum cross-section at a median shoulder 11 substantially midway between the juncture lines 6 and 10.

The outward slope of the metal from the shank portion 2 to the shoulder 11 is preferably such as to form an angle $b$ of approximately 45° with respect to the axis of the bit. Between the corners 12 defined by the outwardly sloping walls 13 of the metal portion joining the shank 2 to the shoulder 11 the shoulder is curved convexly outwardly to provide a formation simulating a rosette design. This bulging of the metal in the shoulder portions 14 between the four sides of the bit provides for arcuate juncture lines 15 between the outwardly diverging walls 9 connecting the driving tip portion 3 to the shoulder 11, allowing a distribution of the metal into the shoulder 11 to take place without any sharp changes in contour or high stress boundary lines or points.

It will be understood that maximum working of the metal occurs at the shoulder 11 and adjoining portions of the torque transfer portion 5 because of maximum metal displacement, and the skin of the metal will be thickest and toughest in this area, which is subjected to maximum torsional stresses in the use of the bit.

Figure 6:
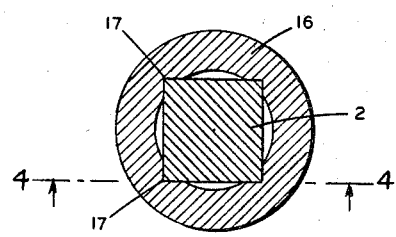
Figure 6 is a horizontal section taken on the line 6—6 of Figure 4.

In use, the bit is forced into a tubular tool shank member 16 with the corners 17 of the bit shank 2 biting into the softer metal of the tool shank 16 as illustrated in Figure 6. In this connection, the median shoulder 11 of the torque transfer portion 5 forms a positive stop to locate the bit in the tool shank. Because of the surrounding tubular formation of the tool shank, the bit shank 2 is securely anchored against turning, and is supported against torsional stresses in the operation of the driver.

Similarly, with the driving tip portion 3 of the bit seated in the socket of the screw 8, this portion is also anchored against turning and is supported against torsional stresses. As socket screws of the type with which bits of the instant invention are adapted to co-operate are always provided with a tapered entrance to the socket, as illustrated by the screw 8 shown in dotted lines in Figure 2, there is afforded in the bit of the present invention by virtue of the provision of the frusto pyramidal portion 5a a further driver bit to screw socket engagement between such portion 5a and the socket entrance to augment torque transfer through to the screw. Above the portion 5a where twisting displacement will be maximum the torque transfer portion 5 is of largest cross section and this relationship serves to greatly increase the resistance of the bit to torsional deformation at this point, and much higher torques can be developed between the tool and the screw with the bit of the configuration disclosed and cold worked as aforesaid than with present bits.

It will be understood that after cold forming the bit will be hardened in the usual manner. In this connection, in addition to the fact that the cold worked metal of the bit is highly resistant to wear through abrasion, the cold forming ensures that there are no sharp corners or edges, and therefore a uniform hardening condition can be obtained throughout the entire bit to prevent portions of the bit from becoming brittle and subject to damage under impact.

Because of the shape of the bit, particularly in the formation of the conical tip or end 4, the taper of the driving tip portion 3, and the arcuate formation of the shoulder portions 14, the metal of the stock from which the bit is formed can be cold forged to an accurate shape free of discontinuities in a simple die without excessive wear on the die to enable economical and efficient production of the bit.

The conical end 4 of the bit is formed as a shallow cone so that it will not in any way adversely affect the driver bit to socket engagement in the driving of the socketed screw, and in this respect the inclinaton of the wall of the conical end 4 is preferably not less than 60° with respect to the bit axis.

Not only does the conical point or end 4 of the driver portion of the bit enable the cold forming of the bit, but by virtue of the elimination of sharp edges at the juncture between the end 4 and the driving tip portion 3 as well as the elimination of sharp brittle edges throughout the remainder of the driver portion, reaming of the screw socket which is presently frequently encountered is eliminated.

It will be understood that variations in the precise details of the bit may be made without departing from the spirit of the invention and scope of the appended claims.

What I claim as my invention is:

1. A screw driver bit comprising a shank portion adapted to be received in the shank of a screw driver, a tip portion forming a frustum of a pyramid of square cross-section and having a slight taper adapted to engage in a correspondingly shaped screw socket, and a torque transfer portion between said tip portion and said shank portion, said shank portion having a cross-sectional dimension smaller than the largest cross-section of said pyramidal tip portion, and said torque transfer portion comprising a portion in the form of a frustum of a pyramid of square cross-section immediately above said tip portion and diverging upwardly and outwardly towards said shank portion at an angle of much greater magnitude than the angle of taper of said tip portion, the sides of said pyramidal torque transfer portion terminating at the top thereof in outwardly bulged peripheral wall portions and said torque transfer portion tapering inwardly from said outwardly bulged peripheral wall portions to said shank portion.

2. A device as claimed in claim 1 in which said pyramidal portion of said torque transfer portion diverges outwardly at an angle of substantially 45°.

3. A device as claimed in claim 1 in which said pyramidal tip portion has the walls thereof inclined to the axis of the bit at substantially 3°.

4. A screw driver bit as claimed in claim 1 in which said end portion terminates in a blunt conical tip.

5. A device as claimed in claim 1 in which said torque transfer portion tapers inwardly from said outwardly bulged peripheral wall portion at an angle of substantially 45°.

6. A device as claimed in claim 1 in which said shank portion is of square cross-section.

References Cited in the file of this patent

UNITED STATES PATENTS

| | | |
|---|---|---|
| 1,787,087 | Robertson | Dec. 30, 1930 |
| 2,721,589 | Hammer | Oct. 25, 1955 |
| 2,804,894 | Rosenburg | Sept. 3, 1957 |
| 2,806,706 | Fitch | Sept. 17, 1957 |

FOREIGN PATENTS

| | | |
|---|---|---|
| 615,006 | France | Oct. 1, 1926 |
| 485,160 | Canada | July 22, 1952 |